(12) United States Patent
Fissette et al.

(10) Patent No.: US 7,533,930 B1
(45) Date of Patent: May 19, 2009

(54) CONVERTIBLE AIRCRAFT PASSENGER SEAT AND METHOD

(75) Inventors: Armand Fissette, Thousand Oaks, CA (US); Magnus Aspergren, Santa Monica, CA (US)

(73) Assignee: Embraer - Empresa Brasileira de Aeronautica S.A., Sao Jose Dos Campos - SP (BR)

( * ) Notice: Subject to any disclaimer, the term of this patent is extended or adjusted under 35 U.S.C. 154(b) by 0 days.

(21) Appl. No.: 11/923,446

(22) Filed: Oct. 24, 2007

(51) Int. Cl.
*A47C 17/04* (2006.01)
*B60N 2/34* (2006.01)
*B60N 2/46* (2006.01)
*B64D 11/06* (2006.01)

(52) U.S. Cl. .................. 297/118; 297/115; 297/244; 297/344.21; 297/344.22; 297/354.13; 297/411.36; 244/118.6

(58) Field of Classification Search .......... 297/115, 297/118, 244, 344.21, 344.22, 354.13, 411.36; 244/118.6
See application file for complete search history.

(56) References Cited

U.S. PATENT DOCUMENTS

| | | | | |
|---|---|---|---|---|
| 23,581 | A * | 4/1859 | Jackson | 297/64 |
| 2,514,798 | A * | 7/1950 | Rowe | 297/115 X |
| 2,993,529 | A * | 7/1961 | Brown | 297/244 X |
| 3,095,234 | A * | 6/1963 | Brooks et al. | 297/244 X |
| 3,379,471 | A * | 4/1968 | Dalziel | 297/244 X |
| 3,394,417 | A * | 7/1968 | O'Link | 297/244 X |
| 3,622,202 | A * | 11/1971 | Brown | 297/344.22 X |
| 4,544,199 | A * | 10/1985 | Wrigley | 297/244 |
| 4,637,081 | A * | 1/1987 | Clark | 5/18.1 |
| 5,568,960 | A * | 10/1996 | Oleson et al. | 297/344.22 |
| 5,857,745 | A * | 1/1999 | Matsumiya | 297/354.13 |
| 5,954,401 | A * | 9/1999 | Koch et al. | 297/354.13 |
| 5,992,798 | A * | 11/1999 | Ferry | 297/354.13 X |
| 6,059,364 | A * | 5/2000 | Dryburgh et al. | 297/354.13 |
| 6,113,183 | A * | 9/2000 | Koch et al. | 297/184.14 |
| 6,119,980 | A * | 9/2000 | Ferry | 244/122 R |
| 6,170,786 | B1 * | 1/2001 | Park et al. | 248/274.1 |
| 6,173,921 | B1 * | 1/2001 | Neumann et al. | 244/118.6 |
| 6,209,956 | B1 * | 4/2001 | Dryburgh et al. | 297/354.13 X |
| 6,276,635 | B1 * | 8/2001 | Ferry et al. | 297/354.13 X |
| 6,305,644 | B1 * | 10/2001 | Beroth | 297/354.13 X |
| 6,352,309 | B1 * | 3/2002 | Beroth | 297/354.13 |

(Continued)

*Primary Examiner*—Rodney B White
(74) *Attorney, Agent, or Firm*—Nixon & Vanderhye P.C.

(57) ABSTRACT

Aircraft seats are provided which may be convertible between a seating condition and a bedding condition. According to exemplary embodiments, aircraft seats comprise a seat bottom, a seat back, and a pair of arm rests positioned laterally with respect to the seat bottom, the seat back being mounted to the seat bottom for pivotal movements between an upright position (wherein the seat back extends vertically upwardly relative to the seat bottom) and a reclined position (wherein the seat back extends substantially horizontally relative to the seat bottom), and each of arm rests being coupled to the seat back and the seat bottom so as to be moveable between raised and lowered positions in response to the seat back being pivoted from the upright position to the reclined position, respectively. Each of the arm rests may define an upper surface which is in a downwardly sloped disposition when the arm rest is in the raised position thereof and is in a substantially horizontal disposition when the arm rest is in the lowered position thereof. In this manner, the arm rests may be moved to a more comfortable disposition when the aircraft seat is converted from a seating condition to a bedding condition.

18 Claims, 7 Drawing Sheets

U.S. PATENT DOCUMENTS

| | | |
|---|---|---|
| 6,494,536 B2 * | 12/2002 | Plant .................. 297/354.13 X |
| 6,688,691 B2 * | 2/2004 | Marechal et al. .... 297/354.13 X |
| 6,692,069 B2 * | 2/2004 | Beroth et al. ............... 297/118 |
| 6,698,836 B1 * | 3/2004 | Veneruso ............... 297/354.13 |
| 6,715,716 B1 * | 4/2004 | Cheung .................. 244/118.6 |
| 6,742,842 B2 * | 6/2004 | Dowty ................... 297/354.13 |
| 6,846,042 B2 * | 1/2005 | Hanson et al. ......... 297/411.36 |
| 6,880,482 B2 * | 4/2005 | Huse .......................... 114/363 |
| 6,883,458 B2 * | 4/2005 | Huse .......................... 114/363 |
| 6,938,957 B2 * | 9/2005 | Beatty et al. ............ 297/344.22 |
| 7,108,325 B2 * | 9/2006 | Williamson et al. . 297/344.22 X |
| 7,252,268 B2 * | 8/2007 | Saint-Jalmes ............ 244/118.6 |
| 7,318,622 B2 * | 1/2008 | Rezag et al. ................. 297/118 |
| 2001/0015566 A1 * | 8/2001 | Park et al. .................... 297/115 |
| 2003/0085597 A1 * | 5/2003 | Ludeke et al. ........ 297/354.13 X |
| 2003/0189370 A1 * | 10/2003 | Hemmer et al. ..... 297/344.21 X |
| 2005/0067870 A1 * | 3/2005 | Rezag et al. ........... 297/354.13 |
| 2008/0088160 A1 * | 4/2008 | Johnson .............. 297/344.21 X |

\* cited by examiner

CONVERTIBLE AIRCRAFT PASSENGER SEAT AND METHOD

CROSS-REFERENCE TO RELATED APPLICATION

The subject matter disclosed herein is related to U.S. Design Pat. No. D577,502 issued on Sep. 30, 2008, the entire content of which is expressly incorporated hereinto by reference.

TECHNOLOGICAL FIELD

The subject matter disclosed herein relates generally to the field of aircraft interiors, and specifically to passenger seats that may be employed in an aircraft interior environment. In especially preferred forms, the subject matter disclosed herein relates to aircraft interior seats that may be converted into a fully reclined condition so as to form a passenger bed when paired with a similar seat.

BACKGROUND AND SUMMARY

It is desirable to provide aircraft passengers with safe and comfortable seating during flight. It also especially may be desirable to allow a passenger to recline fully horizontal so as to provide the passenger with a bedding arrangement that may be employed for rest during prolonged flights. This is particularly true with respect to long distance general aviation aircraft having customized interiors to suit a particular customer's desires.

According to some implementations of the subject matter disclosed herein, an aircraft seat is provided which is relatively easily convertible to a fully reclined (i.e., substantially horizontal) condition. When paired back-to-back with a similar aircraft seat, therefore, a passenger may be provided with a bedding option.

Aircraft seats are provided which may be convertible between a seating condition and a bedding condition. According to exemplary embodiments, aircraft seats comprise a seat bottom, a seat back, and a pair of arm rests positioned laterally with respect to the seat bottom, the seat back being mounted to the seat bottom for pivotal movements between an upright position (wherein the seat back extends vertically upwardly relative to the seat bottom) and a reclined position (wherein the seat back extends substantially horizontally relative to the seat bottom), and each of arm rests being coupled to the seat back and the seat bottom so as to be moveable between raised and lowered positions in response to the seat back being pivoted from the upright position to the reclined position, respectively. Each of the arm rests may define an upper surface which is in a downwardly sloped disposition when the arm rest is in the raised position thereof and is in a substantially horizontal disposition when the arm rest is in the lowered position thereof. In this manner, the arm rests may be moved to a more comfortable disposition when the aircraft seat is converted from a seating condition to a bedding condition.

The arm rests in some embodiments will include an internal supporting cantilever bracket having a rigidly fixed rearward end and extending upwardly and forwardly between the rearward end and a forward end thereof. A linkage bar may be provided which is pivotally connected at a distal end thereof to the forward end of the cantilever bracket and is connected at a proximal end thereof to the seat back to allow for rectilinear sliding movements therebetween. Each side of the seat back may therefore include a slide mechanism. The proximal end of the linkage bar may thus be connected to the slide mechanism to allow for the rectilinear sliding movements therebetween. In some embodiments, each side of the seat back may include a fixed position slide boss whereby each slide mechanism is slidably coupled to a respective slide boss to allow for rectilinear sliding movements therebetween.

The aircraft seats most preferably comprise a base having a support plate for supporting the seat bottom, the support plate being adapted for swiveled mounting to a floor of an aircraft, as well as forward and rearward positioning.

The aircraft seats most preferably comprise a base having a support plate for supporting the seat bottom, the support plate being adapted for swiveled mounting to a floor of an aircraft, as well as forward and rearward positioning.

The aircraft seats most preferably comprise a base having a support plate for supporting the seat bottom, the support plate being adapted for swiveled mounting to a floor of an aircraft, as well as forward and rearward positioning.

A pair of adjacent aircraft seats may be provided so as to be convertible between a seating condition to a bedding condition. Each seat will preferably comprise a seat bottom, a seat back, and a pair of arm rests positioned laterally with respect to the seat bottom, wherein the seat back is mounted to the seat bottom for pivotal movements between an upright position wherein the seat back extends vertically upwardly relative to the seat bottom and a reclined position wherein the seat back extends substantially horizontally relative to the seat bottom, and wherein each of the arm rests is coupled to the seat back and the seat bottom so as to be moveable between raised and lowered positions in response to the seat back being pivoted from the upright position to the reclined position, respectively. The pair of aircraft seats may thus be convertible between a seating condition, wherein each of the seat backs is in the upright position to allow a passenger to be seated thereon, and a bedding condition, wherein each of the seat backs is in a reclined position such that upper ends of the seat backs are oriented in an end-to-end manner so as to allow a passenger to be reclined thereon.

According to other aspects, a method of converting a pair of aircraft seats to a bedding arrangement is provided. According to an exemplary method, a pair of adjacent aircraft seats is provided, wherein each seat comprises a seat bottom, a seat back, and a pair of arm rests positioned laterally with respect to the seat bottom, wherein the seat back is mounted to the seat bottom for pivotal movements between an upright position wherein the seat back extends vertically upwardly relative to the seat bottom and a reclined position wherein the seat back extends substantially horizontally relative to the seat bottom, and wherein each of the arm rests is coupled to the seat back and the seat bottom so as to be moveable between raised and lowered positions in response to the seat back being pivoted from the upright position to the reclined position, respectively. The seats are swiveled so that each seat is in a back-to-back orientation with respect to one another. The seat backs of each seat may thus be moved from the upright position to the reclined position thereof such that upper ends of the seat backs are oriented in an end-to-end manner so as to allow a passenger to be reclined thereon.

According to certain embodiments, the seat backs comprise removable head rests, in which case the head rests are removed to allow for end-to-end positioning thereof when in the reclined position. Each of the arm rests preferably defines an upper surface which may be oriented in a downwardly sloped disposition when the arm rest is in the raised position thereof and oriented in a substantially horizontal disposition when the arm rest is in the lowered position thereof.

These and other features and advantages will be better and more completely understood by referring to the following detailed description of exemplary non-limiting illustrative implementations in conjunction with the drawings.

BRIEF DESCRIPTION OF THE DRAWINGS

An exemplary non-limiting illustrative implementation of the herein disclosed subject matter will be further explained by reference to the drawings of which.

DETAILED DESCRIPTION

Figure 1:
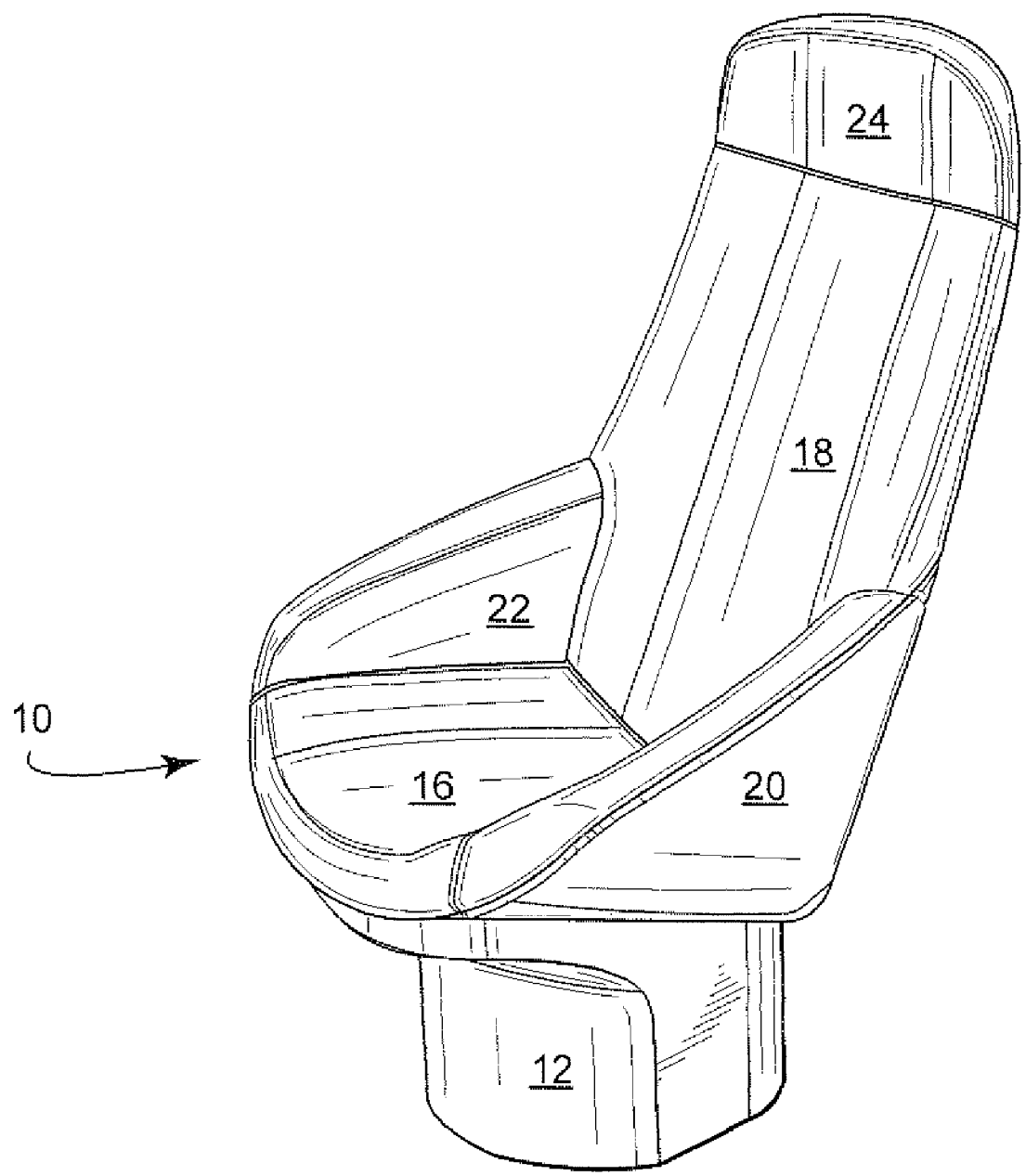
FIG. 1 is a left side perspective view of an aircraft seat in accordance with an implementation of the invention.

The exemplary illustrative non-limiting implementations herein relate to aircraft seats, particularly aircraft seats that may be fully reclined and convertible to a bedding arrangement. As depicted in FIG. 1, an exemplary implementation of an aircraft seat 10 includes a base unit 12 which encloses the operative articulation mechanisms 14 (see FIG. 7 for example), a seat bottom 16, a seat back 18 and left and right side arm rests 20, 22, respectively. The seat back 18 is formed within a shell member that is generally cylindrically shaped around the swivel axis of the seat 10 so as to reduce interference with other aircraft interior monuments when the seat 10 is swiveled. The upper extent of the seat back 18 preferably terminates in a removable head rest 24.

Figure 2:
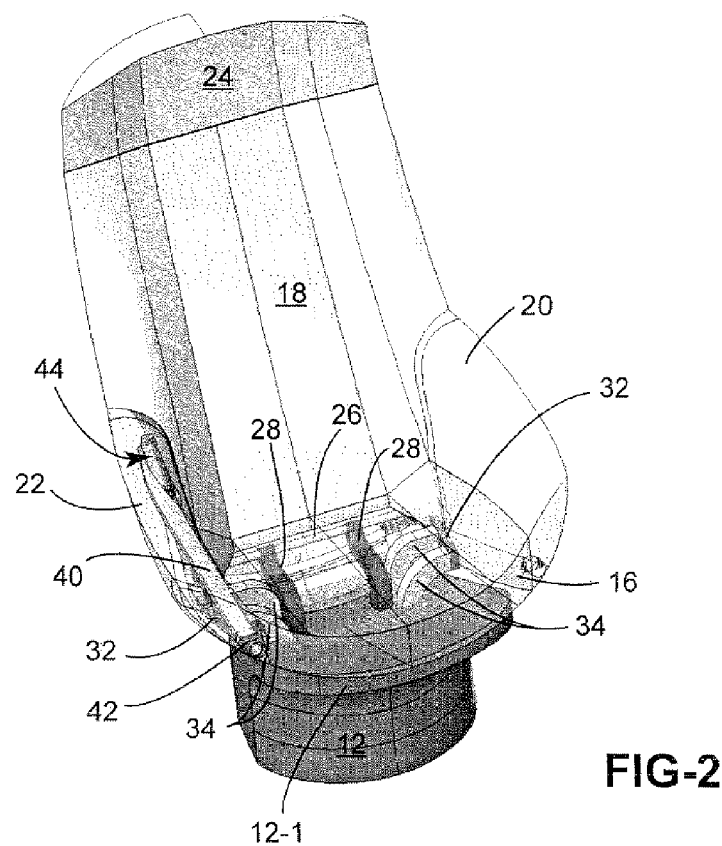
FIG. 2 is a top front perspective view of the aircraft seat depicted in FIG. 1 but in a manner which exposes a portion of the otherwise concealed seat structure.
Figure 3:
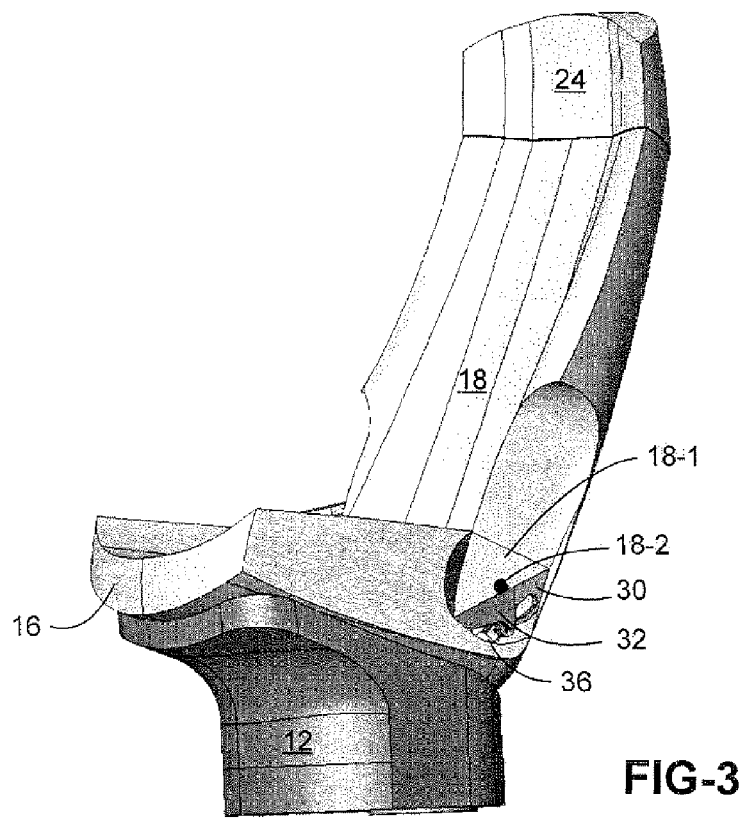
FIG. 3 is left side perspective view of the aircraft seat depicted in FIG. 2 with the side arm rests removed to expose a portion of the otherwise concealed seat structure.
Figure 4:
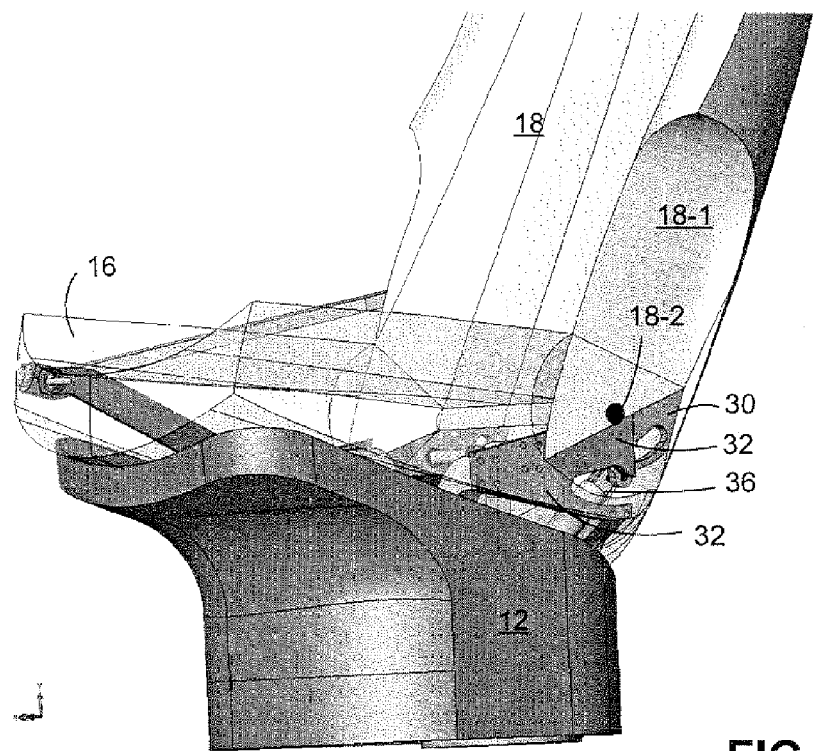
FIG. 4 is a left side perspective view of the aircraft seat with the side arm rests removed in a manner similar to that depicted in FIG. 3, but exposing additional portions of the otherwise concealed seat structure
Figure 5:
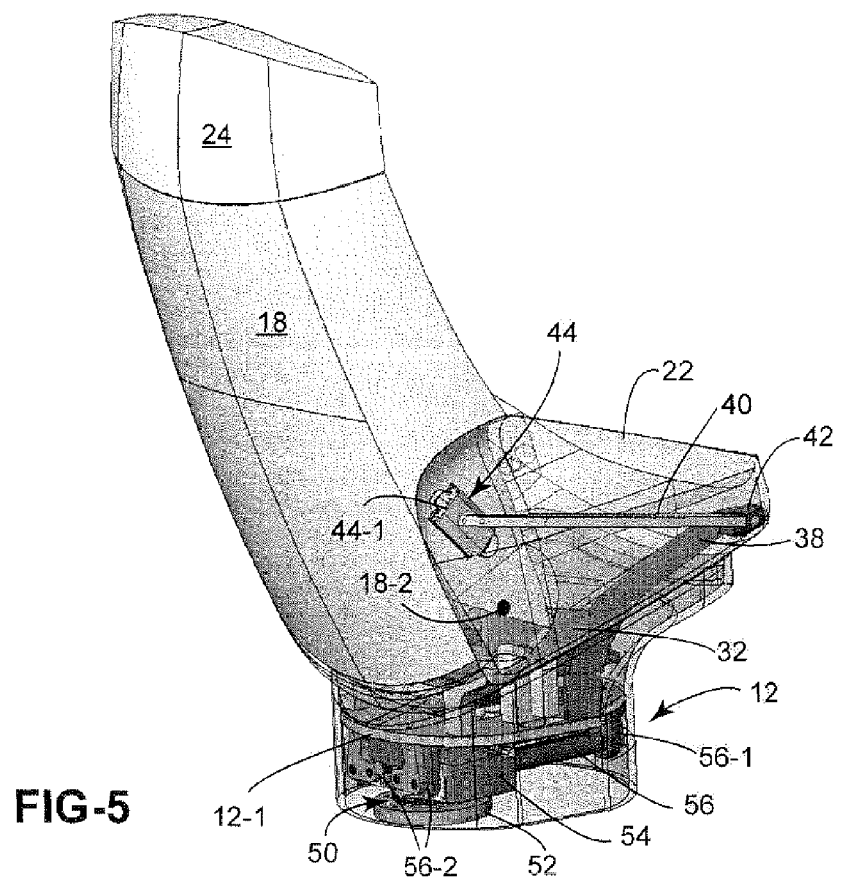
FIG. 5 is a right side rear perspective view of the aircraft seat depicted in FIG. 1 but in a manner which exposes a portion of the otherwise concealed seat structure.
Figure 7:
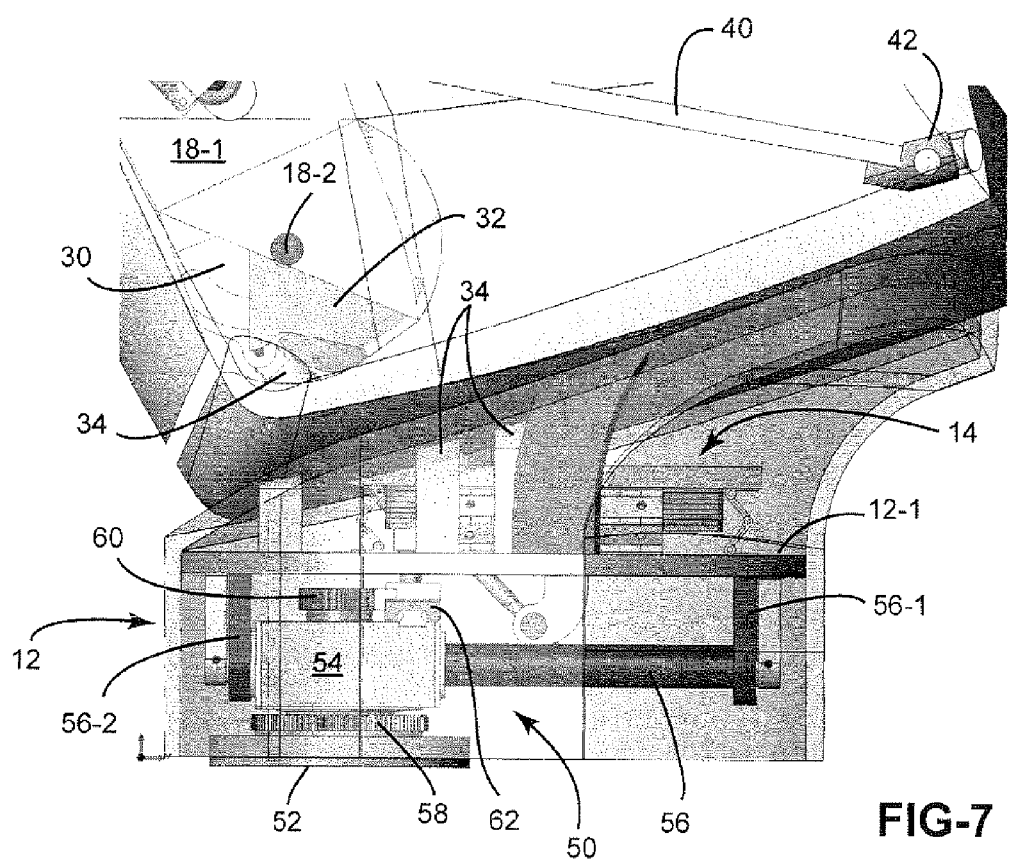
FIG. 7 is a right side elevational view of the articulation mechanisms associated with the aircraft seat depicted in FIG. 1.

As is perhaps more clearly depicted in FIGS. 2 and 3, the seat back 18 includes a lower transverse support rod 26 which is in turn supported by means of support brackets 28 fixed to the seat support plate 12-1 within the base 12 (see FIGS. 5 and 7.) Each end of the support rod 26 is in turn received within a respective one of the slotted guide brackets 30 located on each side of the seat back 18 and fixed to a lateral support plate 32. The lateral support plates 32 are in turn support by means of support brackets 34 fixed to the seat support plate 12-1. The sides 18-1 of the seat back 18 are also pivotally connected to the lateral support plates 32 about pivot axis 18-2. Thus, as the seat back 18 pivots about pivot axis 18-2 to allow for it to be reclined relative to the seat bottom 16, the slotted guide bracket 30 will move concurrently therewith so that the ends of the support rod 26 will traverse in and be guided by the slots defined therein. A hydraulic piston actuator 36 may be operatively connected to one (or both) of the slotted guide brackets 30 so as to provided hydraulic assistance to recline the seat back 18 in dependence upon the hydraulic actuator being extended or retracted (e.g., that may occur upon manual or electrical activation of a seat back reclining control switch).

Figure 6:
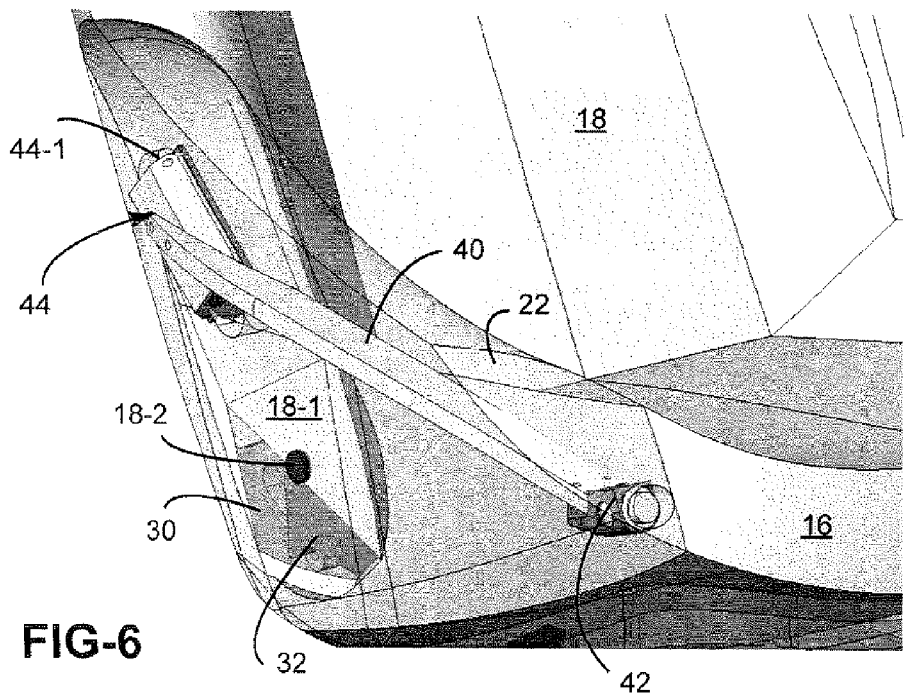
FIG. 6 is front elevational view of the right side arm rest employed in the aircraft seat but depicted in a manner which exposes a portion of the otherwise concealed seat structure.

The left and right arm rests 20, 22 are most preferably provided with an upper arm rest surface which slopes downwardly from a position near the seat back 18 toward the front of the seat 10 so as to provide wider lateral spacing for the passenger's knees when seated in an upright position. As is perhaps more clearly shown in FIGS. 5 and 6, the arm rests 20, 22 are each provided with an internal supporting cantilever bracket 38 having a proximal end fixed rigidly to the support plate 12-1 of the base 12 and extending upwardly and forwardly therefrom. A linkage bar 40 is pivotally connected at its distal end to the forward end of the cantilever bracket 38 via pivot coupling 42. At its opposite end, the linkage bar 40 is connected operatively to a reciprocally movable slide mechanism 44 cooperating with a slide boss 44-1 fixed to the side 18-1 of the seat back 18. Thus, in response to rearward inclination of seat back 18, the slide boss 44-1 will slide within the slide mechanism 44 to move the linkage bar 40 and thereby cause the arm rests 20, 22 to be lowered. Most preferably, the arm rests 20, 22 will be lowered to an extent such that, upon the seat back 18 being fully reclined (e.g., in a substantially horizontal position), the upper arm rest surfaces of the arm rests 20, 22 will be disposed substantially horizontally.

Accompanying FIG. 7 depicts in greater detail the structures housed within the base 12. As shown, the base 12 houses a seat actuator mechanism 50 which served to move the seat base plate relative to three degrees of freedom, that is about x, y and z axes wherein the x axis is align generally parallel to the aircraft centerline, the y axis is generally vertically perpendicular to the aircraft centerline, and the z axis is generally horizontally perpendicular to the aircraft centerline. Thus, the seat actuator mechanism may reciprocally move the seat support plate 12-1 (and hence the entire seat 10) forwardly/rearwardly along the x axis, swivel about the y axis and move laterally outboard/inboard along the z axis. Preferably, the seat actuator mechanism 50 is motor driven so as to allow for these various articulations of the seat 10, but manual operation may also be employed.

The actuator mechanism 50 depicted in FIG. 7 includes a base plate 52 which is fixed to the aircraft structure. The base plate 52 therefore remains fixed in position relative to the aircraft and provides structural support for the base 12 and the components supported thereby. The base plate 52 supports a brake assembly 54 which is operatively coupled to longitudinally extending support rods 56 connected at each end to the seat support plate 12-1 by means of end support brackets 54-1, 54-2. As shown, seat 10 is in its forwardmost position with the brake assembly 50 engaged (e.g., as may be accomplished internally of the brake assembly 50 by means of a friction lock mechanism (not shown)). Thus, by releasing the brake assembly 54 the seat 10 may be moved rearwardly by virtue of the support rods 56 moving linearly relative to the fixed position brake assembly 54. The brake assembly 50 may of course be reset to allow the seat 10 to be locked in any desired position intermediate the full forward and full aft positions.

The seat may be swiveled by means of a pinion gear (not shown) associated with the brake mechanism meshed with the fixed position swivel gear 58 associated with the base plate 52. Again, unlocking the brake mechanism allows the seat to be swiveled by suitable driven connection with the swivel gear 58 or manually. Preferably, the seat is capable of being swiveled up to 90° inboard for seat use and 180° outboard when the seat 10 is being set up for conversion to a bedding arrangement with another similar seat 10. The brake mechanism 50 also includes a drive pinion 60 which is meshed with a rack 62 so as to allow lateral displacements of the seat 10.

Figure 8A:
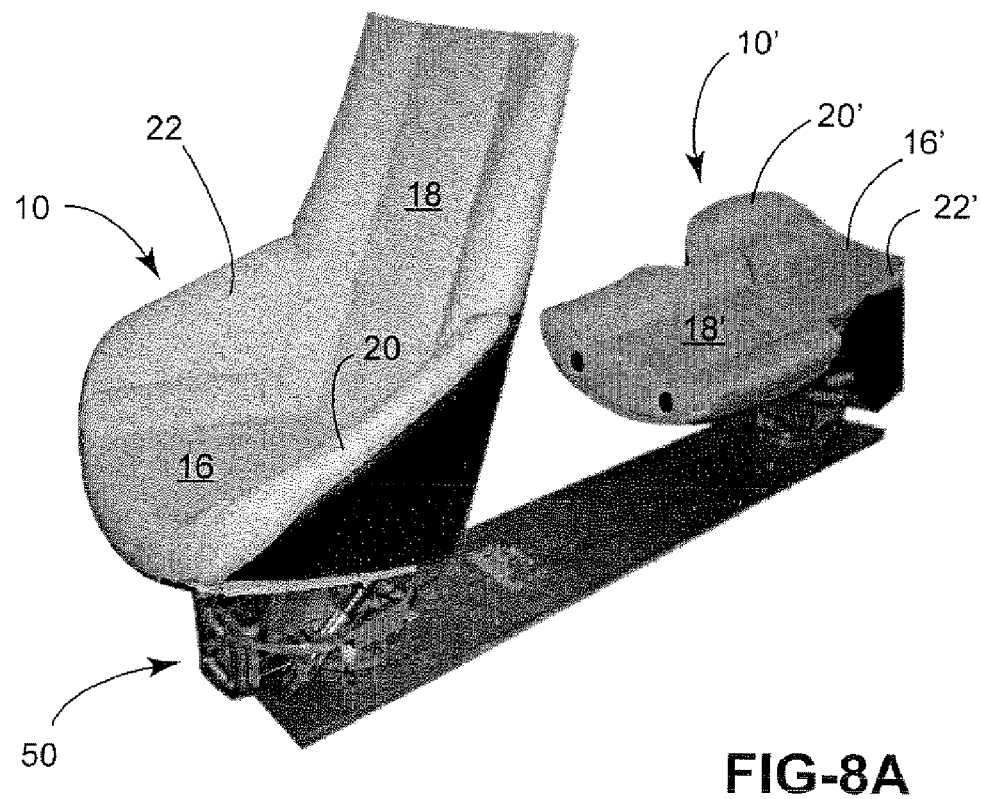
FIGS. 8A through 8E are perspective views showing the manner in which a pair of back-to-back aircraft seats may be fully reclined and converted to a bedding arrangement.
Figure 8B:
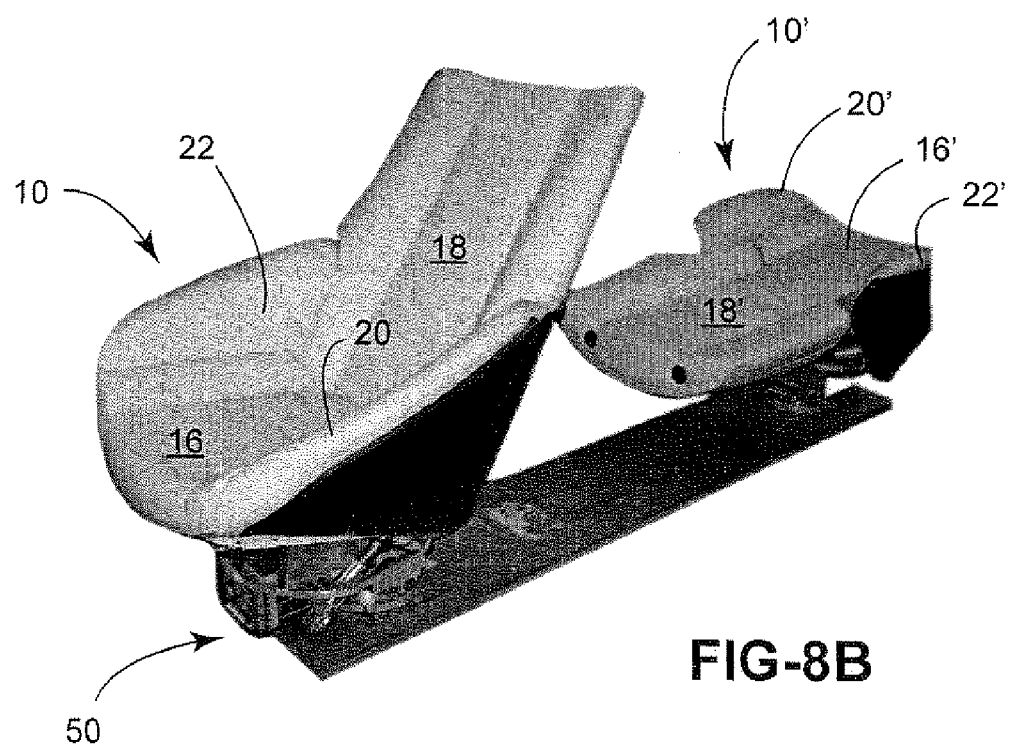
Figure 8C:
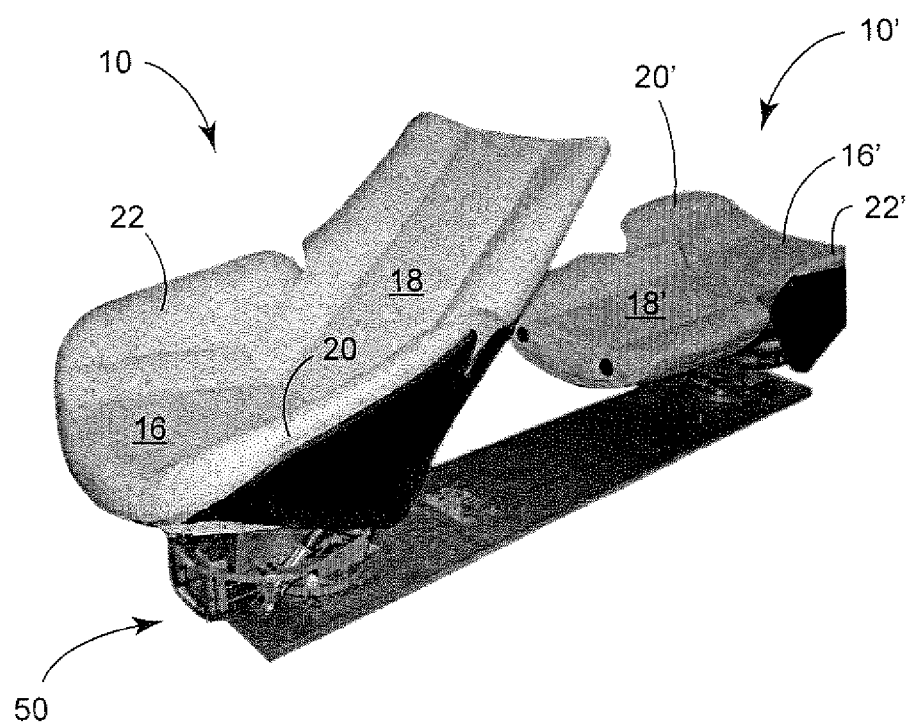
Figure 8D:
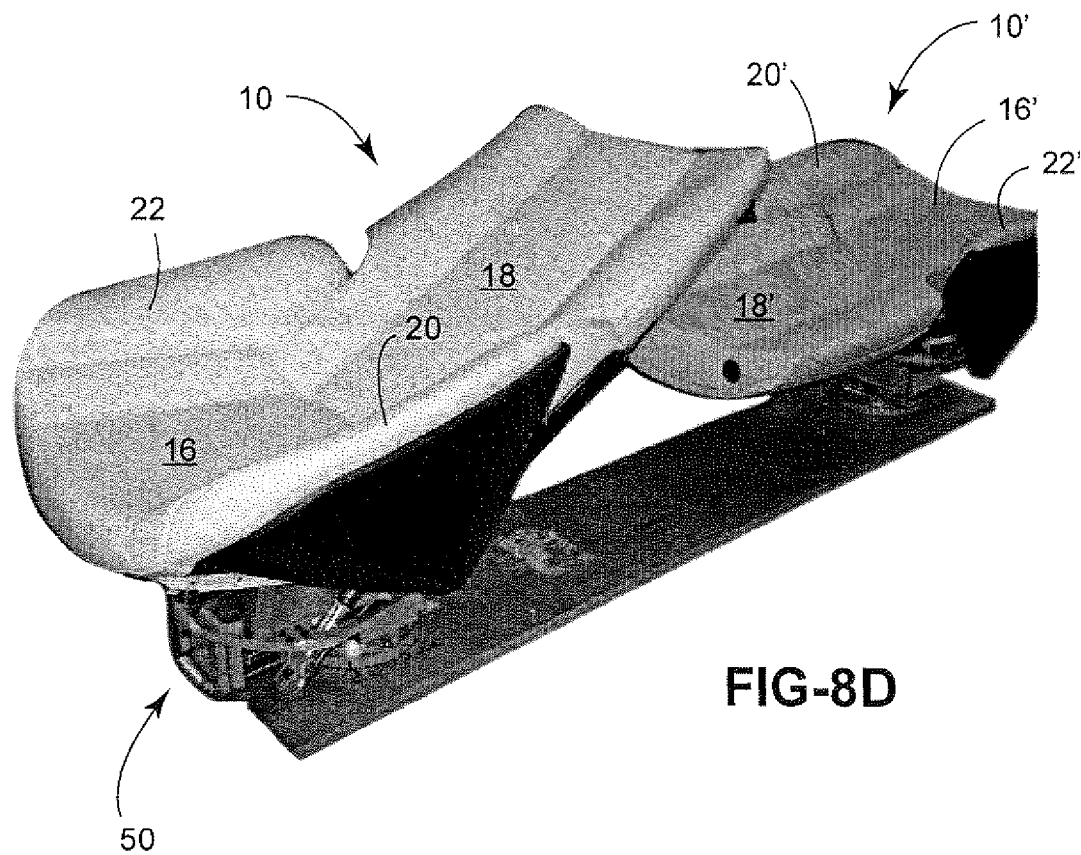
Figure 8E:
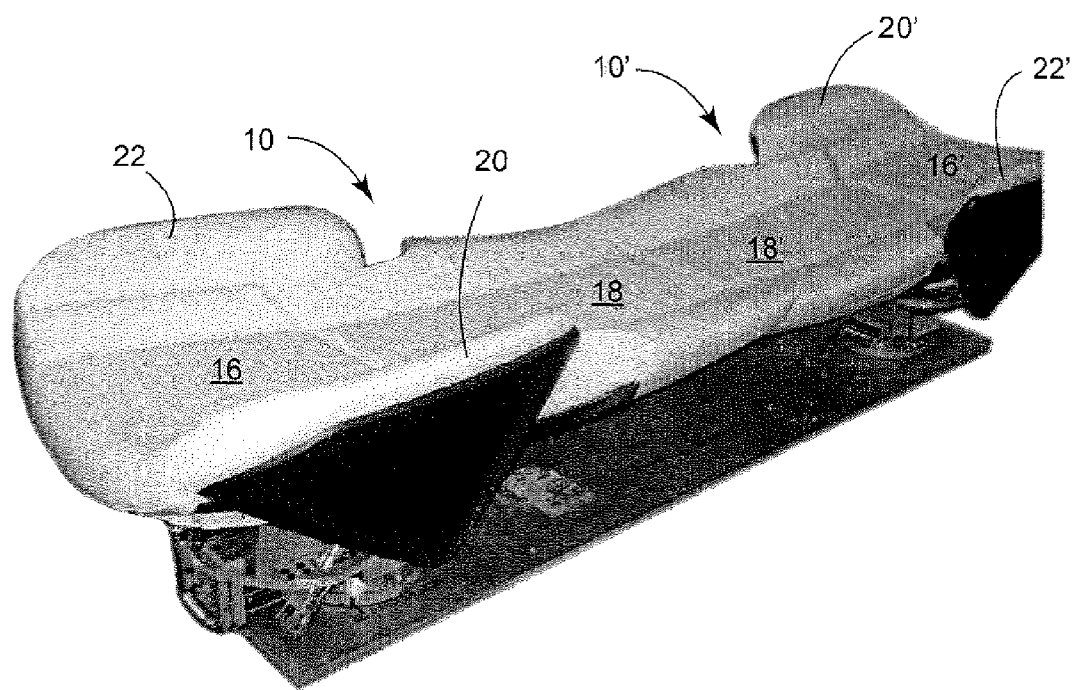

As noted briefly above, a pair of seats 10 as described herein may be converted to a bedding arrangement. Accompanying FIGS. 8A-8E show the manner in which such a conversion may be accomplished. In this regard, a pair of seats 10, 10' are depicted in FIGS. 8A-8E, with the latter seat 10' already having been set up and fully reclined. The seats 10, 10' are structurally similar to one another and include the mechanisms as discussed previously with regard to the seat 10. Moreover, it will be understood that the seats 10, 10' will normally be in a face-to face relationship with another (e.g., in a so-called club seating arrangement). In order to set up the seats 10, 10', an operator will release the brake mechanism 50 so as to allow the seat to move fully backwards and swivel it 180° so the seats 10, 10' are back-to-back. The headrests 24 for each of the seats 10, 10' are removed and the seat backs reclined to a fully horizontal position. In such a position, the upper ends of the seat backs will abut against one another. Moreover, it will be observed in FIGS. 8a-8E that the arm rests 20, 22 will responsively be lowered so that the upper arm rest surfaces are disposed substantially horizontally when the seat back is similarly disposed substantially horizontally. Thus, collectively, the seats 10, 10' when in the fully reclined condition as shown in FIG. 8E serve as a bedding arrangement for an individual passenger.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An aircraft seat comprising:
a seat bottom;
a seat back; and
a pair of arm rests positioned laterally with respect to the seat bottom, wherein
the seat back is mounted to the seat bottom for pivotal movements between an upright position wherein the seat back extends vertically upwardly relative to the seat bottom and a reclined position wherein the seat back extends substantially horizontally relative to the seat bottom, and wherein
each of the arm rests is coupled to the seat back and the seat bottom so as to be moveable between raised and lowered positions in response to the seat back being pivoted from the upright position to the reclined position, respectively, and wherein
each of the arm rests includes an internal supporting cantilever bracket having a rigidly fixed rearward end, the bracket extending upwardly and forwardly between the rearward end and a forward end thereof.

2. An aircraft seat as in claim 1, wherein each of the arm rests defines an upper surface which is in a downwardly sloped disposition when the arm rest is in the raised position thereof and is in a substantially horizontal disposition when the arm rest is in the lowered position thereof.

3. An aircraft seat as in claim 1, comprising a base having a support plate for supporting the seat bottom, the support plate being adapted for swivel mounting to a floor of an aircraft.

4. An aircraft seat as in claim 1, wherein each of the arm rests further includes a linkage bar which is pivotally connected at a distal end thereof to the forward end of the cantilever bracket and is connected at a proximal end thereof to the seat back to allow for rectilinear sliding movements therebetween.

5. An aircraft seat as in claim 4, wherein each side of the seat back includes a slide mechanism, and wherein the proximal end of the linkage bar is connected to the slide mechanism to allow for the rectilinear sliding movements therebetween.

6. An aircraft seat as in claim 5, wherein each side of the seat back includes a fixed position slide boss, and wherein each slide mechanism is slidably coupled to a respective slide boss allow for the rectilinear sliding movements therebetween.

7. An aircraft seating system comprising a pair of aircraft seats adapted for attachment to a floor of an aircraft and positioned adjacent to one another, wherein each aircraft seat comprises:
a seat bottom, a seat back, and a pair of arm rests positioned laterally with respect to the seat bottom, wherein
the seat back is mounted to the seat bottom for pivotal movements between an upright position wherein the seat back extends vertically upwardly relative to the seat bottom and a reclined position wherein the seat back extends substantially horizontally relative to the seat bottom, and wherein
each of the arm rests is coupled to the seat back and the seat bottom so as to be moveable between raised and lowered positions in response to the seat back being pivoted from the upright position to the reclined position, respectively, and wherein
the pair of aircraft seats is convertible between a seating condition, wherein each of the seat backs is in the upright position to allow a passenger to be seated thereon, and a bedding condition, wherein each of the seat backs is in a reclined position such that upper ends of the seat backs are oriented in an end-to-end manner so as to allow a passenger to be reclined thereon.

8. An aircraft which includes an aircraft seating system as in claim 7.

9. The aircraft seating system as in claim 7, wherein each of the arm rests defines an upper surface which is in a downwardly sloped disposition when the arm rest is in the raised position thereof and is in a substantially horizontal disposition when the arm rest is in the lowered position thereof.

10. The aircraft seating system as in claim 7, wherein each of the seats comprises a base having a support plate for supporting the seat bottom, the support plate being adapted for swivel mounting to a floor of an aircraft.

11. The aircraft seating system as in claim 7, wherein each of the arm rests includes an internal supporting cantilever bracket having a rigidly fixed rearward end and extending upwardly and forwardly between the rearward end and a forward end thereof.

12. The aircraft seating system as in claim 11, wherein each of the arm rests further includes a linkage bar which is pivotally connected at a distal end thereof to the forward end of the cantilever bracket and is connected at a proximal end thereof to the seat back to allow for rectilinear sliding movements therebetween.

13. The aircraft seating system as in claim 12, wherein each side of the seat back includes a slide mechanism, and wherein the proximal end of the linkage bar is connected to the slide mechanism to allow for the rectilinear sliding movements therebetween.

14. The aircraft seating system as in claim 13, wherein each side of the seat back includes a fixed position slide boss, and wherein each slide mechanism is slidably coupled to a respective slide boss allow for the rectilinear sliding movements therebetween.

15. A method of converting a pair of aircraft seats to a bedding arrangement, comprising the steps of:
(a) providing a pair of adjacent aircraft seats, wherein each seat comprises a seat bottom, a seat back, and a pair of arm rests positioned laterally with respect to the seat bottom, wherein the seat back is mounted to the seat bottom for pivotal movements between an upright position wherein the seat back extends vertically upwardly relative to the seat bottom and a reclined position wherein the seat back extends substantially horizontally relative to the seat bottom, and wherein each of the arm rests is coupled to the seat back and the seat bottom so as to be moveable between raised and lowered positions in response to the seat back being pivoted from the upright position to the reclined position, respectively;
(b) swiveling the seats so that each seat is in a back-to-back orientation with respect to one another; and
(c) moving the seat backs of each seat from the upright position to the reclined position thereof such that upper ends of the seat backs are oriented in an end-to-end manner so as to allow a passenger to be reclined thereon.

16. A method as in claim 15, wherein the seat backs comprise removable head rests, the method further comprising removing the head rests from the seat backs.

17. A method as in claim 15, wherein each of the arm rests defines an upper surface, the method further comprising orienting the upper surface of each arm rest in a downwardly sloped disposition when the arm rest is in the raised position thereof and orienting the upper surface of each arm rest in a substantially horizontal disposition when the arm rest is in the lowered position thereof.

18. An aircraft which includes an aircraft seat as in claim 1.

\* \* \* \* \*